(12) United States Patent
Miyazawa et al.

(10) Patent No.: US 9,666,917 B2
(45) Date of Patent: May 30, 2017

(54) AIR CELL AND ASSEMBLED BATTERY EMPLOYING SAME

(71) Applicant: NISSAN MOTOR CO., LTD., Kanagawa (JP)

(72) Inventors: Atsushi Miyazawa, Kamakura (JP); Keita Iritsuki, Yokohama (JP); Tomokatsu Himeno, Yokohama (JP); Mori Nagayama, Yokohama (JP); Yoshiko Tsukada, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 175 days.

(21) Appl. No.: 14/377,210

(22) PCT Filed: Feb. 6, 2013

(86) PCT No.: PCT/JP2013/052724
§ 371 (c)(1),
(2) Date: Aug. 7, 2014

(87) PCT Pub. No.: WO2013/118771
PCT Pub. Date: Aug. 15, 2013

(65) Prior Publication Data
US 2016/0013528 A1 Jan. 14, 2016

(30) Foreign Application Priority Data

Feb. 7, 2012 (JP) .................................. 2012-023775
Feb. 1, 2013 (JP) .................................. 2013-018072

(51) Int. Cl.
*H01M 12/06* (2006.01)
*H01M 6/42* (2006.01)
(Continued)

(52) U.S. Cl.
CPC .......... *H01M 12/065* (2013.01); *H01M 6/32* (2013.01); *H01M 6/42* (2013.01); *H01M 8/245* (2013.01)

(58) Field of Classification Search
CPC ...... H01M 12/065; H01M 8/245; H01M 6/42; H01M 6/32
See application file for complete search history.

(56) References Cited

U.S. PATENT DOCUMENTS 3,758,342 A 9/1973 Baba
4,343,869 A 8/1982 Oltman et al.
(Continued)

FOREIGN PATENT DOCUMENTS

CN 2379923 Y 5/2000
JP 57189467 A 11/1982
(Continued)

*Primary Examiner* — Milton I Cano
*Assistant Examiner* — Michael Dignan
(74) *Attorney, Agent, or Firm* — Young Basile Hanlon & MacFarlane, P.C.

(57) ABSTRACT

In air cells which are stacked on one another and used as an assembled battery, an electrolytic solution layer is formed between a positive electrode material and a negative electrode material, and one or two or more deformation prevention materials are arranged for preventing deformation by abutting the positive electrode material or the negative electrode material or abutting both of them.

10 Claims, 8 Drawing Sheets

(51) Int. Cl.
*H01M 8/24* (2016.01)
*H01M 6/32* (2006.01)

(56) References Cited

U.S. PATENT DOCUMENTS

| | | | | |
|---|---|---|---|---|
| 4,755,272 A | * | 7/1988 | Plowman | C25B 9/04 |
| | | | | 204/256 |
| 5,049,457 A | * | 9/1991 | Niksa | H01M 2/1264 |
| | | | | 429/188 |
| 5,415,949 A | * | 5/1995 | Stone | H01M 2/18 |
| | | | | 429/406 |
| 5,439,758 A | * | 8/1995 | Stone | H01M 2/18 |
| | | | | 429/403 |
| 5,650,241 A | | 7/1997 | McGee | |
| 2005/0238949 A1 | | 10/2005 | Morris et al. | |
| 2006/0286429 A1 | * | 12/2006 | Shiepe | C25B 9/08 |
| | | | | 429/514 |
| 2010/0316935 A1 | * | 12/2010 | Friesen | H01M 2/38 |
| | | | | 429/512 |
| 2012/0321968 A1 | | 12/2012 | Sato et al. | |
| 2014/0120430 A1 | * | 5/2014 | Nagayama | H01M 12/06 |
| | | | | 429/406 |

FOREIGN PATENT DOCUMENTS

| | | | | | |
|---|---|---|---|---|---|
| JP | | 2005527069 A | | 9/2005 | |
| JP | | 3152998 U | | 7/2009 | |
| WO | | 2011087089 A1 | | 7/2011 | |
| WO | WO | 2012/172837 | * | 12/2012 | H01M 6/30 |

* cited by examiner

AIR CELL AND ASSEMBLED BATTERY EMPLOYING SAME

CROSS REFERENCE TO RELATED APPLICATIONS

The present application claims priority to Japanese Patent Applications No. 2012-023775 filed on Feb. 7, 2012 and Japanese Patent Application No. 2013-018072 filed on Feb. 1, 2013, each incorporated herein in its entirety.

TECHNICAL FIELD

The present invention relates to an air cell and an assembled battery employing the same.

BACKGROUND

As a technique relating to this kind of air cell, there is disclosed one called a "water cell" disclosed in Japanese Registered Utility Model No. 3152998, which includes a first and a second end part where two water injection ports are formed, an in-negative-electrode cylindrical body made of metal, powder filling material which is made of oxide material and filled in the in-negative-electrode cylindrical body, and a rod-like positive electrode current collector which is configured with a carbon inserted into this powder filling material, in an inside of the in-negative-electrode cylindrical body, a separation wall is provided for separating the inside, and on the second end part side of the inside, a space part where the powder filling material is not filled is formed. Another related technique is illustrated in Japanese Patent Application Laid-Open Publication (Translation of PCT Application) No. 2005-527069.

SUMMARY

When the water cells described in Japanese Registered Utility Model No. 3152998 are used stacked on one another, however, there remained a problem to be solved that, if a large load is applied for reducing a contact resistance with each other, the cell could be deformed or broken due to the space part formed on the second end part side where the powder filling material is not filled. Further, even if a measure not to deform the space part or the like is taken, there arises another problem that a region where electrolytic solution cannot penetrate could be caused thereby in a part of the positive electrode which contacts the electrolytic solution and it would take time to inject and diffuse the electrolytic solution and activation might be delayed.

According to the present invention, it is possible to provide an air cell and an assembled battery using the same in which deformation is not caused even when the cells are used stacked on one another with a load large enough to reduce contact resistance between the cells.

According to a technical aspect of the present invention, in air cells stacked on one another and used as an assembled battery, in an electrolytic solution layer formed between a positive electrode material and a negative electrode material, one or two or more deformation prevention materials are arranged for preventing deformation by abutting the positive electrode material or the negative electrode material or abutting both of them. Moreover, a flow allowable part which abuts at least one of the positive electrode material and the negative electrode material to allow flow of an electrolytic solution is formed on an end face of the deformation prevention material.

According to this configuration, even when the air cells are stacked on one another to form the assembled battery, it is possible to prevent the deformation of the electrolytic solution layer by the one or two or more deformation prevention materials for preventing deformation by contacting the positive electrode material or the negative electrode material or contacting both of them. Further, the electrolytic solution can be diffused quickly.

DESCRIPTION OF EMBODIMENTS

Hereinafter, embodiments for carrying out the present invention will be explained with reference to the drawings.

Figure 1:
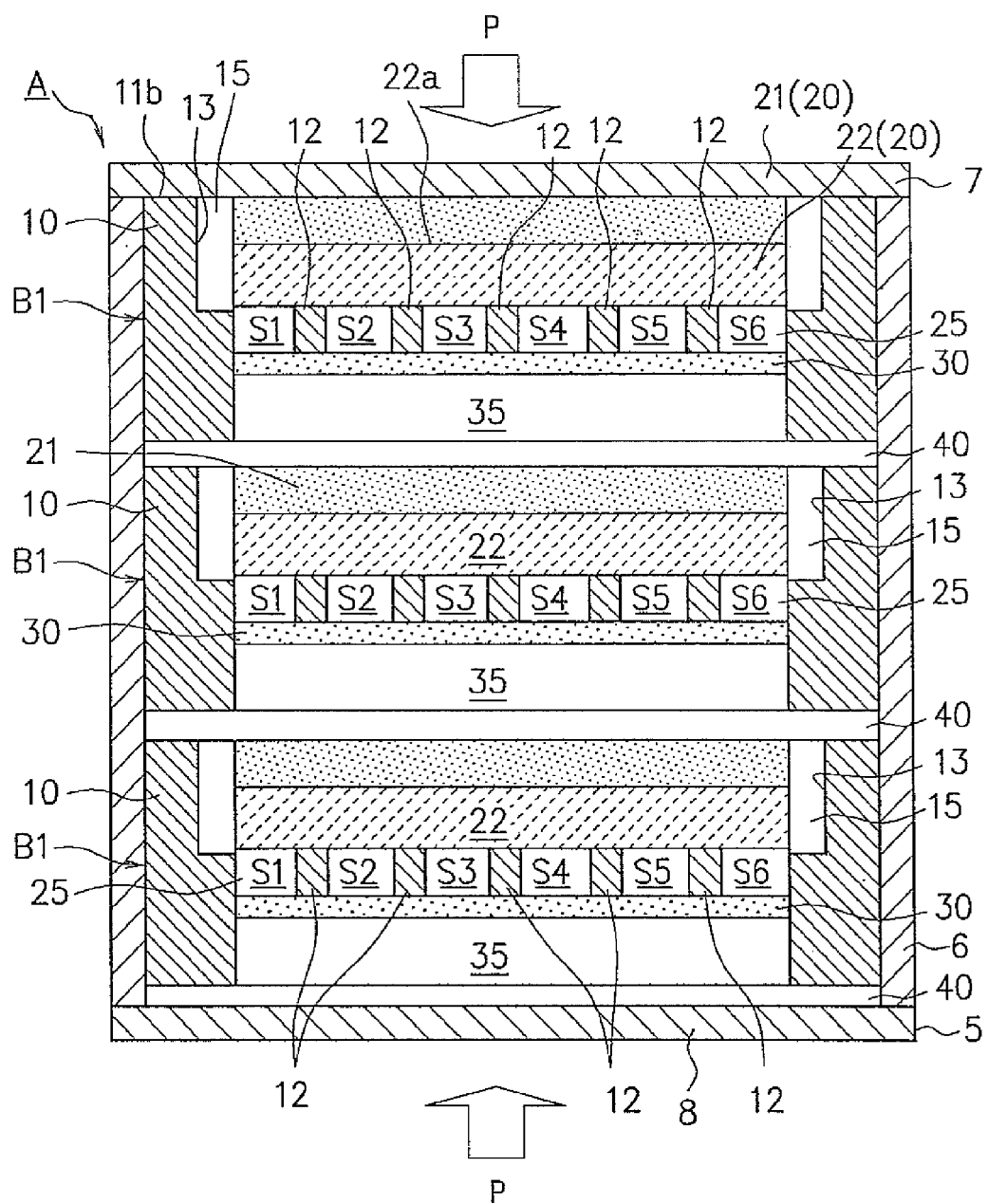
FIG. 1 is a cross-sectional view of an assembled battery using an air cell according to a first embodiment of the present invention.
Figure 2A:
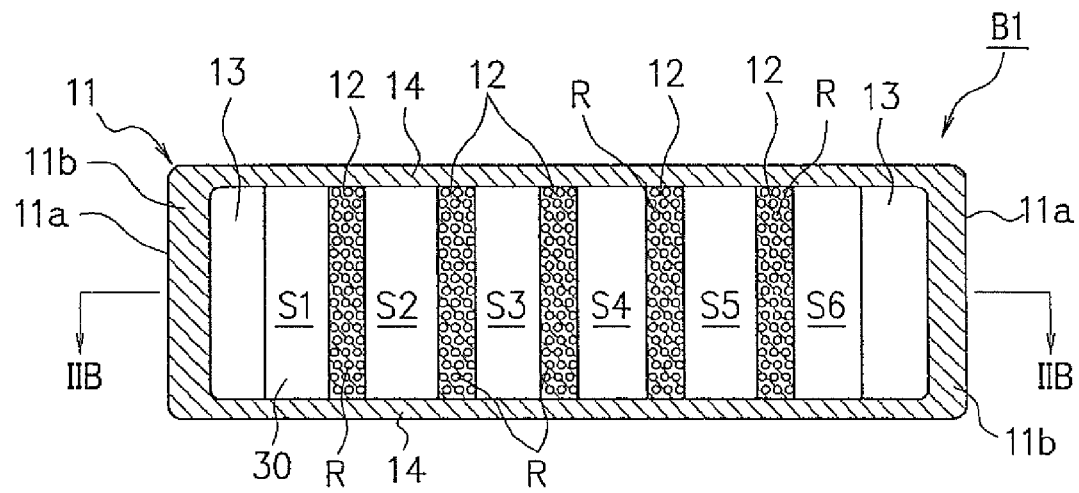
FIG. 2(A) is a plan view of a frame body configuring a part of an air cell according to the first embodiment of the present invention.
Figure 2B:
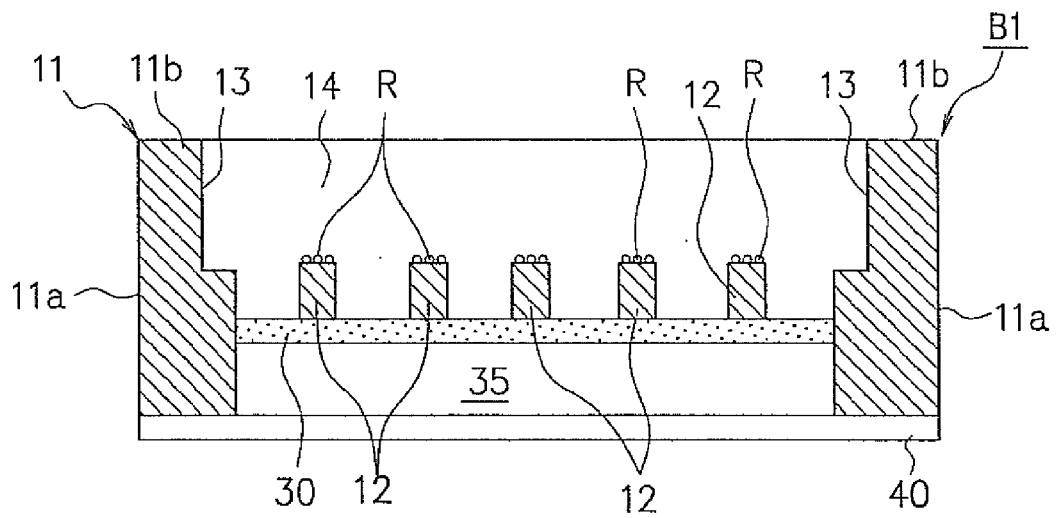
FIG. 2(B) is a cross-sectional view along a line shown in FIG. 2(A).

FIG. 1 is a cross-sectional view of an assembled battery using an air cell according to a first embodiment of the present invention, and FIG. 2(A) is a plan view of a frame body configuring a part of the air cell according to the first embodiment of the present invention and FIG. 2(B) is a cross-sectional view along a IIB-IIB line shown in FIG. 2(A).

As illustrated in FIG. 1, an assembled battery A according to an example of the present invention accommodates three air cells B1 stacked on one another vertically, in a case 5, and a load shown by the arrow is applied to these air cells B1.

The case 5 includes a cylindrical main body 6 having a height capable of accommodating the stacked air cells B1, and cap members 7 and 8 closing the upper and lower openings of this main body 6. Here, the direction of the load application is depicted by sign P in FIG. 1.

The air cell B1 according to the first embodiment of the present invention includes a frame body 10, a contact member 15, a positive electrode component 20, an electrolytic solution layer 25, a separator 30, a negative electrode material 35, and a current collector plate 40. The frame body 10 illustrated in the present embodiment is made of resin having an electrolytic solution resistance, and a resin reinforced into FRP using CF, GF, or the like can be employed to give a higher strength.

Specifically, the frame body 10 is formed of general purpose resin such as polypropylene, fluorine resin, acryl, vinylchloride, vinylidenechloride, polyisobutylene, polyetherchloride, furan resin, epoxy resin, and nylon or super engineering plastic such as polyphenylene-sulfied and polyether-etherketone. "Electrolytic solution" is an aqueous solution or non-aqueous solution mainly containing KOH or chloride.

The frame body 10 illustrated in the present embodiment includes an outer frame material 11 having openings in both upper and lower faces and having a rectangular shape in a planar view, and five deformation prevention materials 12 disposed in the above electrolytic solution layer 25 which is arranged between a positive electrode material 22 and a negative electrode material 35 to be described below, at a predetermined spacing in the longitudinal direction of this outer frame material 11, for preventing deformation by contacting the positive electrode material 22 or the negative electrode material 35 or contacting both of them.

Moreover, as illustrated in FIGS. 2(A) and 2(B), on the contact plane (upper plane in the drawing) of the deformation prevention material 12 with the positive electrode material 22, a flow allowable part R is formed to allow flow of the electrolytic solution. Note that the drawing illustrates a state in which the positive electrode material 22 and the like are removed for showing the flow allowable part R explicitly.

The five deformation prevention materials 12 are separated from each other at a required spacing and also integrally cross-linked between side walls 14 and 14, and a space surrounded by the outer frame material 11 is partitioned and formed into six electrolytic solution spaces S1 to S6 by these deformation prevention materials 12. The electrolytic solution space is a space for retaining the injected electrolytic solution.

While, in the present embodiment, the deformation prevention material 12 indirectly contacts the negative electrode material 35 via the separator 30, it may be obviously configured such that the deformation prevention material 12 directly abuts the negative electrode material 35 without via the separator 30.

While the flow allowable part R to allow the electrolytic solution to flow therethrough as shown in the present embodiment is a part where a plurality of minute convex parts is formed, an end part of the deformation prevention material 12 may be used as the flow allowable part R having minute convex parts. That is, when the flow allowable part R abuts the positive electrode material 22, the flow allowable part R is formed so that the electrolytic solution is able to flow in the contact region.

Further, there may be formed a number of communication grooves communicating between the electrolytic solution spaces S1 to S6 which are partitioned by the deformation prevention materials 12.

In the present embodiment, the deformation prevention material 12 does not face-contact the positive electrode material 22 but substantially point-contacts the minute convex parts of the flow allowable part R. Therefore, it is possible to flow and diffuse the electrolytic solution also in the contact region while supporting the load application (P) via the positive electrode material 22.

On the inner faces of the upper end parts of both end walls 11a and 11a of the outer frame material 11, contact fitting parts 13 and 13 are formed as steps having a height approximately the same as the height of the contact member 15. The contact member 15 is formed by a conductive material made of metal, and is conductively connected to each of a liquid-tight breathable membrane 21 to be described below and the positive electrode material 22 and also conductively contacts the current collector plate 40 of another air cell B1 neighboring on the upper side in the drawing.

The contact member 15 of the present embodiment is formed as a plate-like material having a size fitting into the contact fitting part 13 and also formed so as to have a height flush with the upper end face 11b of the outer frame material 11 when fitted into the contact fitting part 13.

The positive electrode component 20 of the present embodiment includes the liquid-tight breathable membrane 21 and the positive electrode material 22. This positive electrode component 20 is a conductive layer formed of a catalyst to perform oxidation-reduction reaction in the positive electrode material 22 and carbon powder, for example, for forming a conductive path, and includes binder or the like for forming the catalyst and the carbon powder as a layer.

The liquid-tight breathable membrane 21 with a liquid-tight breathability has a number of minute holes formed for performing gas (air) supply to the positive electrode, and also is made of fluoride resin so that the electrolytic solution does not leak outside.

The liquid-tight breathable membrane 21 of the present embodiment is formed in a rectangular shape in a planar view matching a profile surrounded by the contact members 15 and the side walls 14 and 14. In other words, the liquid-tight breathable membrane 21 is formed so as to cover the outer face 22a of the positive electrode material 22 to be described below.

The positive electrode material 22 is formed of conductive and also porous material including the catalyst, and, for example, the positive electrode material 22 is formed of carbon material and binder resin and includes the catalyst such as manganese dioxide in the conductive porous body.

The separator 30 separates the above positive electrode material 22 from the negative electrode material 35. The negative electrode material 35 is made of pure metal or an alloy such as Li, Al, Fe, Zn, and Mg, for example. The current collector plate 40 has conductivity and a property of preventing the electrolytic solution from leaking outside the cartridge, and, in addition to stainless steel and copper (alloy), a material in which corrosion-resistant metal is plated on a metal surface is used, for example.

According to the air cell B1 configured as above, it is possible to suppress deformation of the components such as the electrolytic solution layer 25 which is caused by the compressive load when the plurality of air cells is stacked, and also to secure a space for filling the electrolytic solution.

According to this air cell B1, the electrolytic solution can be diffused also into a boundary face between the deformation prevention material 12 and the positive electrode material 22, and therefore the electrolytic solution easily penetrates to allow quick activation when the electrolytic solution is injected. Moreover, since electrochemical reaction can be performed sufficiently even in a positive electrode material part abutting the deformation prevention material 12, it is possible to improve power generation efficiency.

Further, hydrophilic processing may be performed for the above deformation prevention material 12 on the face (upper face in the drawing) abutting the positive electrode material 22, by coating, for example. The hydrophilic processing may be performed so as to allow the electrolytic solution to penetrate onto the upper surface of the deformation prevention material 12 when the electrolytic solution is injected, and the hydrophilic processing is not required to have a chemical resistance or durability.

Also in this case, the electrolytic solution can be supplied to penetrate between the upper face of the deformation prevention material 12 and the positive electrode material 22, and, since the electrolytic solution can be supplied sufficiently even in a positive electrode material part abutting the deformation prevention material 12 to cause the reaction to be performed sufficiently in this part, it is possible to improve the power generation efficiency.

While the flow allowable part R is formed on the boundary face between the deformation prevention material 12 and the positive electrode material 22, the flow allowable part R may be formed on the boundary face between the deformation prevention material 12 and the separator 30 (negative electrode material 35). Illustration of the flow allowable part R will be omitted in the following embodiments.

Figure 3A:
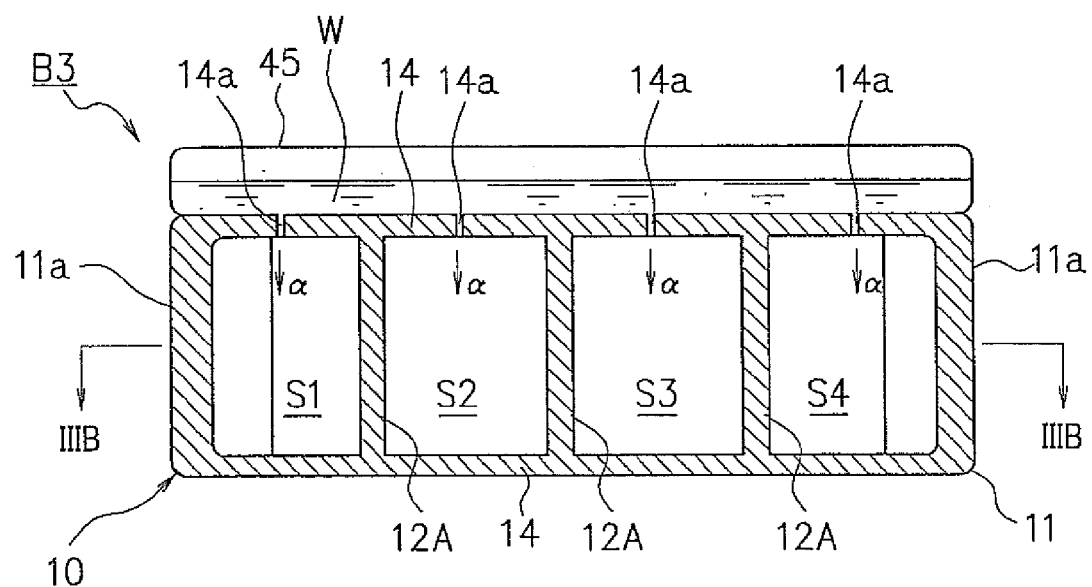
FIG. 3(A) is a plan view of a frame body configuring a part of an air cell according to a second embodiment of the present invention.
Figure 3B:
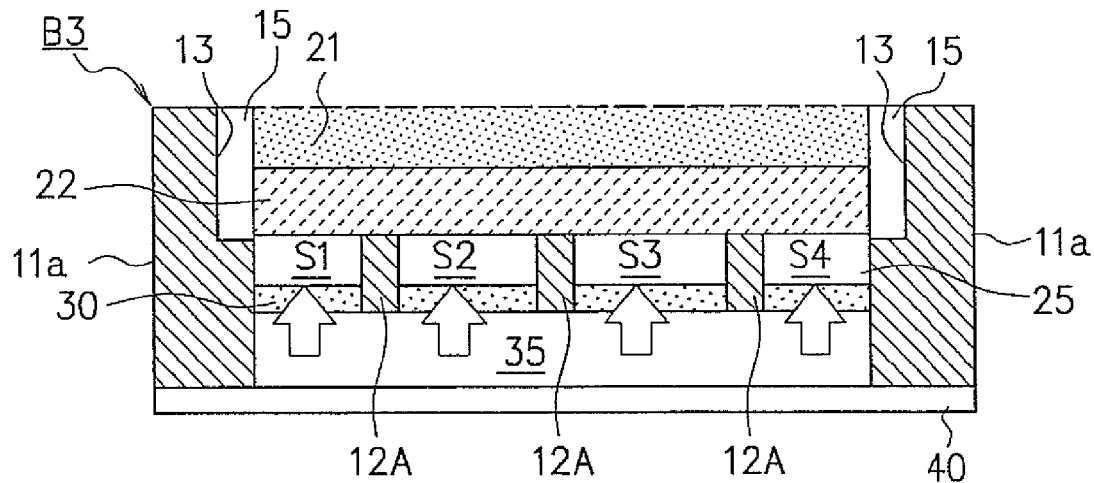
FIG. 3(B) is a cross-sectional view along a line shown in FIG. 3(A).

There will be explained an air cell according to a second embodiment of the present invention with reference to FIGS. 3(A) and 3(B). FIG. 3(A) is a plan view of a frame body configuring a part of the air cell according to the second embodiment of the present invention, and FIG. 3(B) is a cross-sectional view along a IIIB-IIIB line shown in FIG. 3(A). The same sign is attached to the same constituent as one explained in the above embodiment, and explanation will be omitted.

The air cell B3 according to the present embodiment has a configuration in which a solution injection tank 45 is arranged on the outer face on one of the above side walls 14, and water injection ports 14a are formed in the side wall 14 at respective positions facing the electrolytic solution spaces S1 to S4 which are partitioned by a deformation prevention material 12A. Further, the deformation prevention material 12A illustrated in the present embodiment is formed so as not to perpendicularly cross an injection direction α of the electrolytic solution injected from outside. Moreover, the upper face of the deformation prevention material 12A contacts the lower face of the positive electrode material 22 and also the lower face is formed at such a height as to contact the upper face of the negative electrode material 35.

That is, the extension direction of the deformation prevention material 12A is configured not to perpendicularly cross the above main axis direction α of the injection flow in the electrolytic solution when viewed from above. In other words, the normal direction of a virtual face defined by the deformation prevention material 12A is not parallel to but preferably perpendicular to the main axis direction α.

Accordingly, since the deformation prevention material 12A has laminar flow boundary layers formed on both sides of the deformation prevention material 12A, the main axis of the electrolytic solution flow does not hit the deformation prevention material 12A directly and a laminar flow is formed without being disturbed by the generation of an eddy or the like, and thereby it is possible to efficiently diffuse the electrolytic solution W to the whole electrolytic solution space. Further, it is possible to perform the activation quickly after the injection of the electrolytic solution. Moreover, the flow allowable part R which is not illustrated in the drawing is formed on the end part of the deformation prevention material 12A, and thereby it is possible to realize higher power generation efficiency.

Figure 4A:
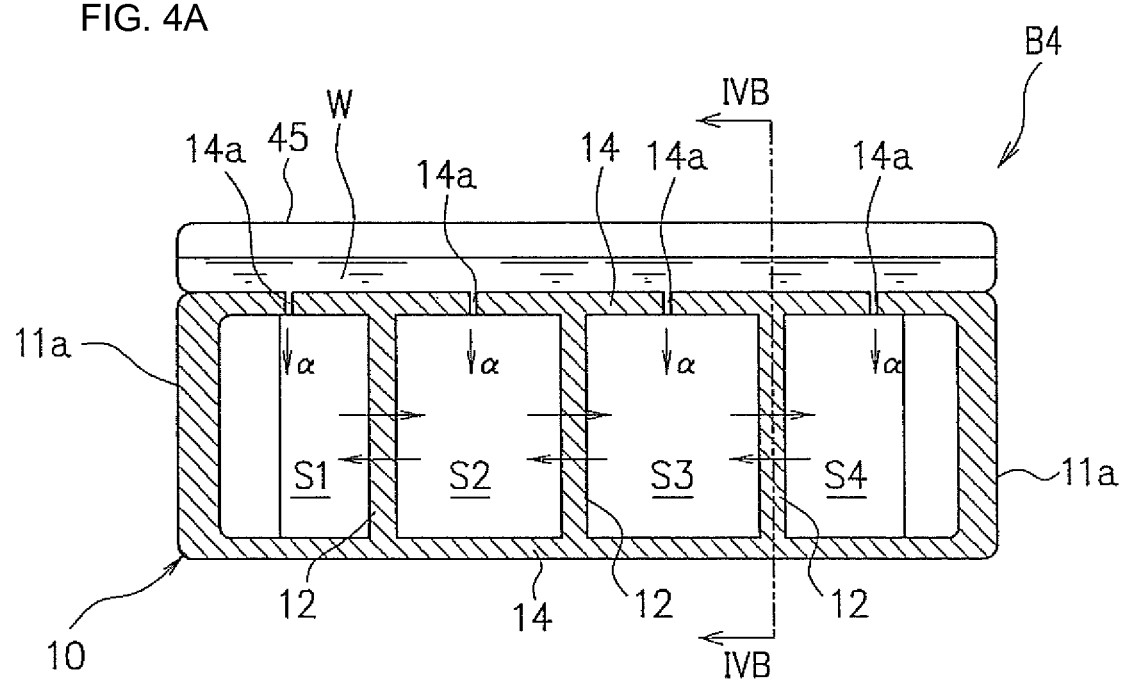
FIG. 4(A) is a plan view of a frame body configuring an air cell according to a third embodiment of the present invention.
Figure 4B:
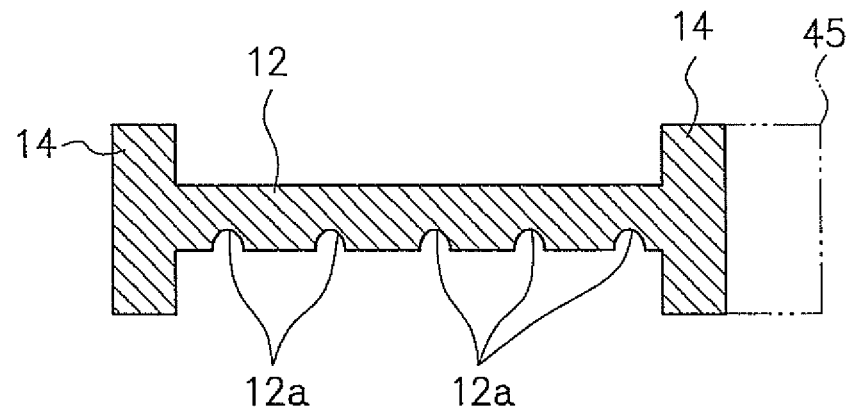
FIG. 4(B) is a cross-sectional view along a IVB-IVB line shown in FIG. 4(A).

There will be explained an air cell according to a third embodiment of the present invention with reference to FIGS. 4(A) and 4(B). FIG. 4(A) is a plan view of a frame body configuring a part of the air cell according to the present embodiment, and FIG. 4(B) is a cross-sectional view along a IVB-IVB line as illustrated in FIG. 4(A). Here, the same sign is attached to the same constituent as one in each of the above embodiments, and explanation will be omitted.

The air cell B4 according to the present embodiment has a configuration in which the solution injection tank 45 is disposed on the outer face of one of the above side walls 14 and the water injection ports 14a are formed on the side wall 14 at respective positions facing the electrolytic solution spaces S1 to S4 which are partitioned by the deformation prevention material 12, as in the above air cell B3. Note that only the frame body 10 and the solution injection tank 45 are illustrated in FIGS. 4(A) and 4(B).

The deformation prevention material 12 of the present embodiment is formed extending in parallel to the injection direction α of the electrolytic solution W between both of the end walls 11a and 11a so as to cause the extension direction thereof not to perpendicularly cross the injection direction α of the electrolytic solution W which is injected from outside.

Thereby, the electrolytic solution injected from outside can be diffused preferably to the whole region of the electrolytic solution spaces S1 to S4. That is, it is possible to diffuse the electrolytic solution W effectively and also it is possible to perform the activation quickly after the injection of the electrolytic solution.

In each of the deformation prevention materials 12, an electrolytic solution communication part is formed for circulating the electrolytic solutions in both of the electrolytic solution spaces S1 and S2, for example, which are partitioned and formed on both sides of the deformation prevention material 12.

In the present embodiment, as the electrolytic solution communication part, a plurality of electrolytic solution circulation holes 12a each having an approximately circular shape is formed for communicating between both of the electrolytic solution spaces S1 and S2 or the like which are partitioned and formed by each of the deformation prevention materials 12.

As a result, it is possible to circulate the electrolytic solution W in both of the electrolytic solution spaces S1 and S2 or the like through the electrolytic solution circulation holes 12a, and thereby it is possible to diffuse the electrolytic solution W effectively and also it is possible to perform the activation quickly after the injection of the electrolytic solution.

Note that the electrolytic solution communication holes are not limited to holes formed having the same shape and the same size as each other, and the size and the like may be changed in a regular pattern, for example. Further, the electrolytic solution communication hole is not limited to a shape of a hole, and a shape of a notch or a groove may be formed.

Figure 5:
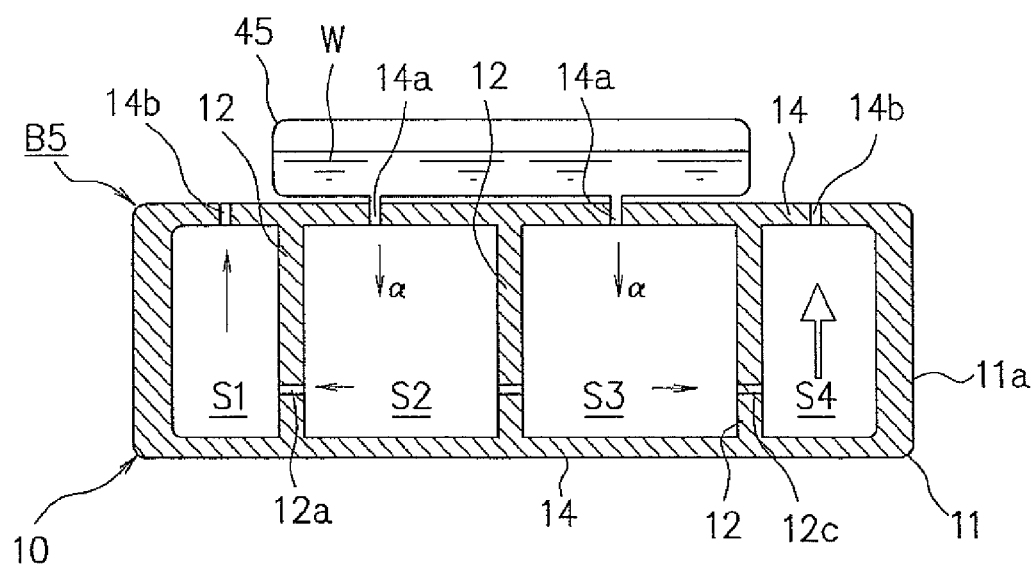
FIG. 5 is a plan view of a frame body configuring an air cell according to a fourth embodiment of the present invention.

There will be explained an air cell according to a fourth embodiment of the present invention with reference to FIG. 5. FIG. 5 is a plan view of a frame body configuring a part of the air cell according to the present embodiment. Here, the same sign is attached to the same constituent as one explained in each of the above embodiments, and explanation will be omitted.

The air cell B5 according to the present embodiment has a configuration in which the inside of the frame body 10 is partitioned and formed into the four electrolytic solution spaces S1 to S4 by cross-linking the three deformation prevention materials 12, 12, and 12 between the side walls 14 and 14 of the frame body 10.

The above plurality of electrolytic solution circulation holes 12a is formed in each of the deformation prevention materials 12 and 12 on both end sides of the deformation prevention materials 12, 12, and 12.

The above water injection port 14a is not formed on one of the side walls 14 and 14 at positions facing the electrolytic solution spaces S1 and S4 which are defined and formed on both of the end sides. That is, it is configured such that the electrolytic solution W cannot be injected directly from outside into the electrolytic solution spaces S1 and S4.

In the present embodiment, air vent holes 14b and 14b are formed at positions facing the electrolytic solution spaces S1 and S4 which are defined and formed on both of the end sides.

In this configuration, when the electrolytic solution is injected into the electrolytic solution spaces S2 and S3, the electrolytic solution can be circulated and diffused to the electrolytic solution spaces S1 and S4 through the electrolytic solution circulation holes 12a formed in the deformation prevention materials 12 and 12 on both end sides.

That is, when the electrolytic solution W is injected, it is possible to control the flow order of the electrolytic solution W flowing inside with the deformation prevention material 12 and to push out air existing in the electrolytic solution spaces S1 and S4 quickly through the air vent holes 14b and 14b. Further, quick injection of the electrolytic solution W becomes possible and it is possible to reduce a time from the injection to the power generation.

Figure 6A:
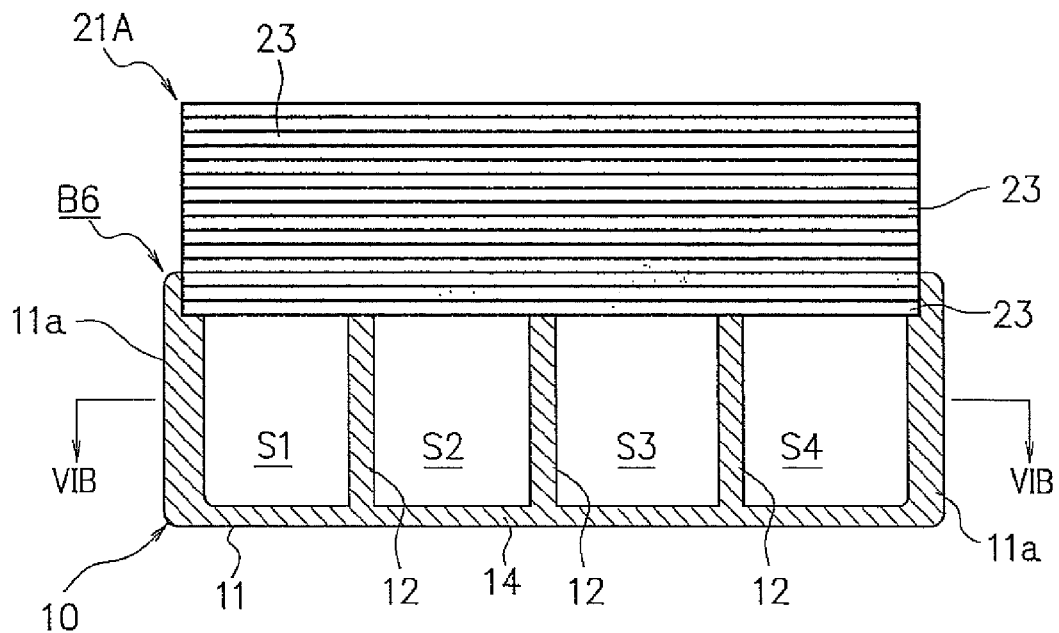
FIG. 6(A) is a plan view of a state in which a frame body and a liquid-tight breathable membrane configuring a part of an air cell according to a fifth embodiment of the present invention are removed.
Figure 6B:
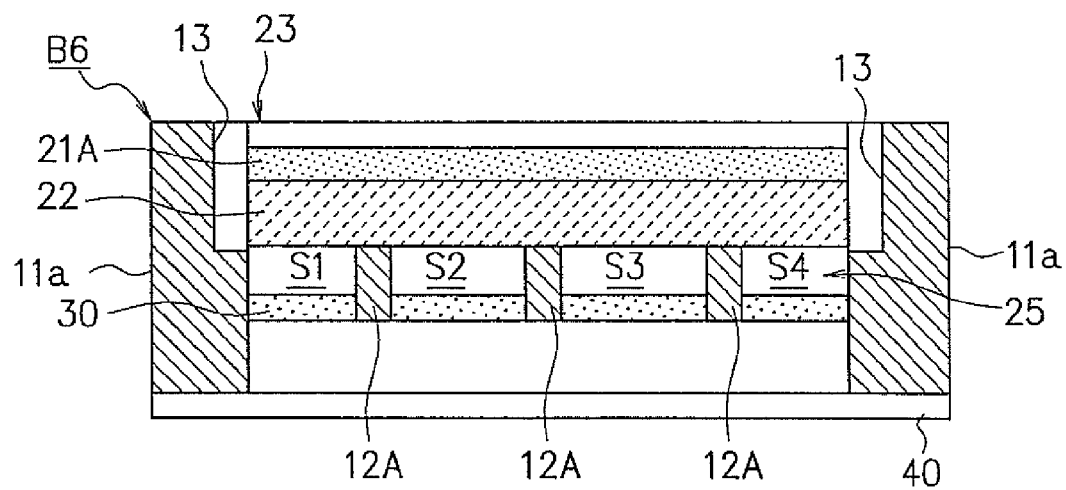
FIG. 6(B) is a cross-sectional view along a VIB-VIB line shown in FIG. 6(A) in a state in which the liquid-tight breathable membrane is attached.

There will be explained an air cell according to a fifth embodiment with reference to FIGS. 6(A) and 6(B). FIG. 6(A) is a plan view in a state where the frame body and the liquid-tight breathable membrane configuring a part of the air cell according to the present embodiment are removed, and FIG. 6(B) is a cross-sectional view along a VIB-VIB line illustrated in FIG. 6(A) in a state where the liquid-tight membrane is attached. The same sign is attached to the same constituent as one explained in each of the above embodiments, and explanation will be omitted.

In the air cell B6 according to the present embodiment, the liquid-tight breathable membrane is different from the one described above. In a liquid-tight breathable membrane 21A, groove parts 23 are formed at a constant spacing forming air flow paths and also the groove parts 23 are configured so as to perpendicularly cross the injection direction α of the electrolytic solution.

According to this configuration, since the convex and concave part of the liquid-tight breathable membrane 21 and the deformation prevention material 12A, on which the load is applied, are formed perpendicularly crossing each other, it is possible to prevent the deformation of the positive electrode material 22.

Further, it is possible to prevent breakage of the positive electrode material 22 by the deformation, and performance stability degradation because of flow variation among the gas flow paths formed in plurality.

Figure 7A:
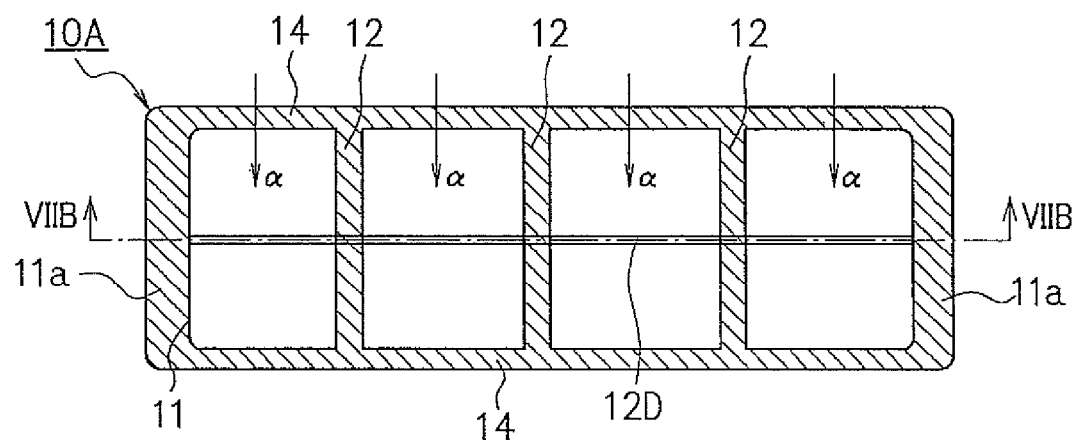
FIG. 7(A) is a plan view of a frame body configuring a part of an air cell according to a sixth embodiment of the present invention.
Figure 7B:
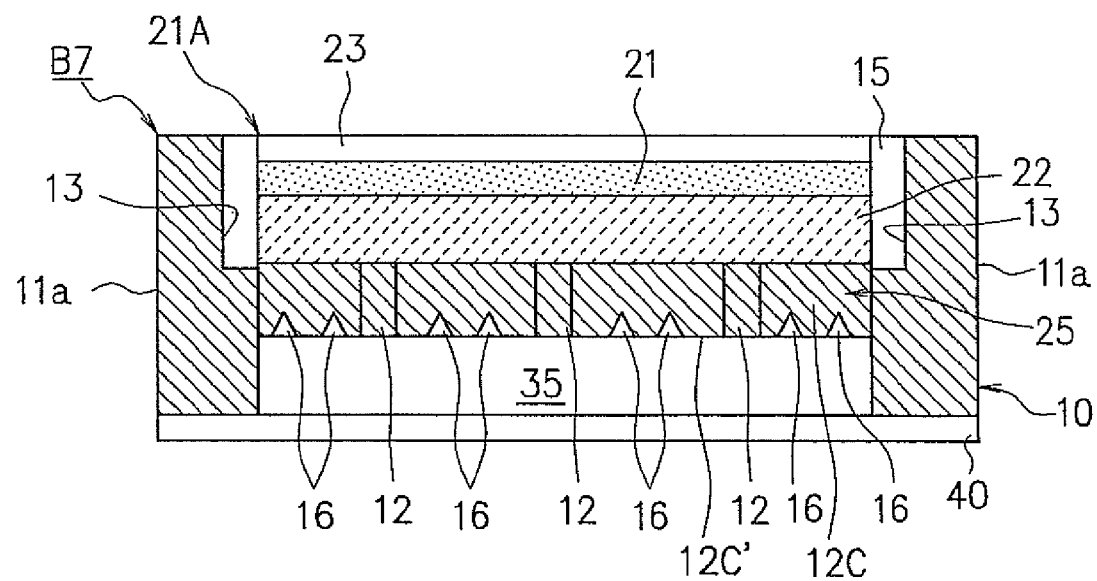
FIG. 7(B) is a cross-sectional view along a VIIB-VIIB shown in FIG. 7(A).

There will be explained an air cell according to a sixth embodiment with reference to FIGS. 7(A) and 7(B). FIG. 7(A) is a plan view of a frame body configuring a part of the air cell according to the present embodiment, and FIG. 7(B) is a cross-sectional view along a VIIB-VIIB line shown in FIG. 7(A). The same sign is attached to the same constituent as one explained in each of the above embodiments, and explanation will be omitted.

In the air cell B7 according to the present invention, the configuration of the frame body is different. A frame body 10A illustrated in the present embodiment is configured such that an outer frame material 11 having openings in the upper and lower faces and having a rectangular shape in a planar view, three deformation prevention materials 12A disposed in the electrolytic solution layer 25 which is arranged between the positive electrode material 22 and the negative electrode material 35, at a predetermined spacing along the longitudinal direction of this outer frame material 11, for preventing the deformation by abutting the positive electrode material 22 or the negative electrode material 35 or by contacting both of them are arranged. Furthermore, a second deformation prevention material 12C is cross-linked between the end walls 11a and 11a in agreement with the centerline O of the outer frame material 11 in the longitudinal direction.

The second deformation prevention material 12C is formed having the same width (height) as the deformation prevention material 12A, and, on the lower edge 12C', a plurality of electrolytic solution circulation grooves 16 is formed at a required spacing for circulating the electrolytic solution in the electrolytic solution spaces which are divided into two by the second deformation prevention material 12c.

According to this configuration, it is possible to divide the load when the air cells are stacked on one another, and also, since the electrolytic solution circulation groove 16 is provided, the electrolytic solution is not prevented from diffusing in the injection. Further, it is also possible to reduce the activation time by the effective injection while suppressing the deformation in each of the air cells when the air cells are stacked on one another.

Figure 8:
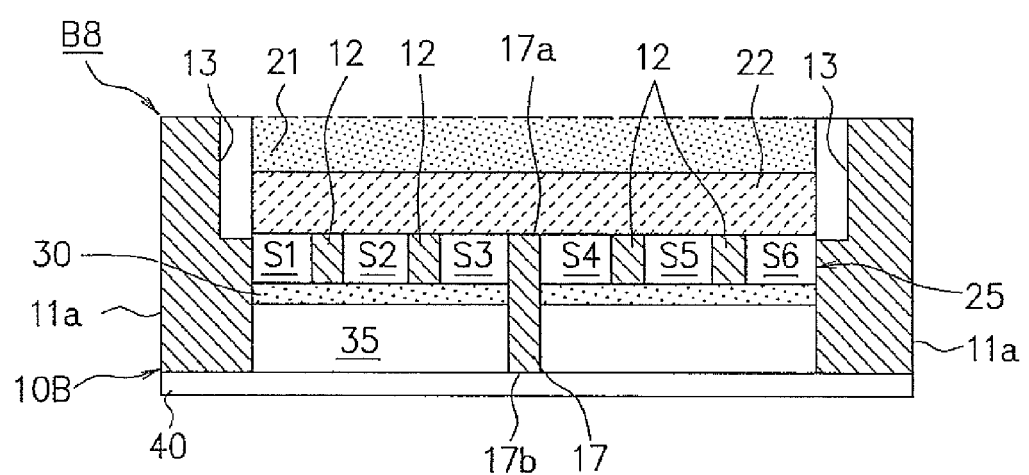
FIG. 8 is a plan view of a frame body configuring a part of an air cell according to a seventh embodiment of the present invention.

There will be explained an air cell according to a seventh embodiment of the present invention with reference to FIG. 8. FIG. 8 is a cross-sectional view of the air cell according to the present embodiment. Here, the same sign is attached to the same constituent as one explained in each of the above embodiments, and explanation will be omitted.

In the air cell B8 according to the present embodiment, the structure of the frame body is different. A frame body 10B illustrated in the present embodiment has a structure in which an outer frame material 11 having openings on the upper and lower faces and having a rectangular shape in a planar view, four deformation prevention materials 12 and a deformation prevention material 17 disposed in the electrolyte layer 25 arranged between the positive electrode material 22 and the negative electrode material 35, at a predetermined spacing along the longitudinal direction of this outer frame material 11, for preventing the deformation by contacting the positive electrode material 22 or the negative electrode material 35 or by contacting both of them are arranged.

The deformation prevention material 17 is arranged at the center of the four deformation prevention materials 12 and the upper end face thereof 17a is flushed with the upper end faces of the other deformation prevention materials 12 and also the lower end face 17b thereof is formed having such a height as to abut the upper face of the current collector plate 40.

According to this configuration, even if the negative electrode material 35 is exhausted and reduced by discharge, the deformation prevention material 17 can continuously bear the load when the air cells are stacked on one another and also can suppress the deformation of the air cell.

While the present invention has been explained in detail in the above, not only the configurations explained in the embodiments are applied to the respective embodiments but also the configuration explained in one embodiment can be applied or applied with a modification to another embodiment, and, further, the embodiments can be combined optionally.

While the case of forming the electrolytic solution circulation part on the deformation prevention material is explained in the above embodiments, the deformation prevention material may be formed of a porous material capable of circulating the electrolytic solution in both of the electrolytic solution spaces which are partitioned and formed on both sides thereof.

As a result, the electrolytic solution in the neighboring two electrolytic solution spaces and the like can communicate to each other, and therefore it is possible to diffuse the electrolytic solution effectively and also to perform the activation quickly after the injection of the electrolytic solution.

According to the present invention, the deformation is not caused even when the air cells are used stacked on one another while a load large enough to reduce a contact resistance between the cells is applied. Further, even when the deformation prevention goods are provided, a region where the electrolytic solution cannot penetrate is not caused and therefore the activation can be performed quickly, and, moreover, since the electrochemical reaction can be performed on the whole surface of the electrode, the power generation efficiency is high.

The invention claimed is:

1. An air cell, comprising:
a positive electrode material;
a negative electrode material;
an electrolytic solution layer formed between the positive electrode material and the negative electrode material;
an outer frame around the positive electrode material, the negative electrode material and the electrolytic solution layer;
one or more deformation prevention materials configured to prevent deformation by abutting at least the positive electrode material, each of the one or more deformation prevention materials extending between side walls of the outer frame to partition the electrolytic solution layer into a plurality of electrolytic solution spaces;
a flow allowable part formed on an end face of the one or more deformation prevention materials that is in contact with the positive electrode material, the flow allowable part configured to allow flow of an electrolytic solution to the positive electrode material at an interface between the one or more deformation prevention materials and the positive electrode material;
a plurality of electrolytic solution communication parts formed in the one or more deformation prevention materials and configured to circulate the electrolytic solution between adjacent electrolytic solution spaces; and
injection holes for injecting the electrolytic solution into a respective electrolytic solution space.

2. The air cell according to claim 1, wherein
hydrophilic processing is performed on a face of the one or more deformation prevention materials abutting the positive electrode material.

3. The air cell according to claim 1, wherein
at least one of the one or more deformation prevention materials is formed of a porous material capable of circulating the electrolytic solution in both electrolytic solution spaces which are partitioned and formed on both sides of the one or more deformation prevention materials.

4. The air cell according to claim 1, wherein
the one or more deformation prevention materials is formed of polypropylene, fluorine resin, acryl resin, vinylchloride resin, vinylidenechloride resin, polyisobutylene, polyetherchloride, furan resin, epoxy resin, nylon, polyphenylene-sulfide or polyether-etherketone.

5. The air cell according to claim 1, wherein
a plurality of flow paths for circulating air is formed in parallel to one another in a liquid-tight breathable membrane which is stacked and formed on the positive electrode material, and arranged so that a direction of the plurality of flow paths and the one or more deformation prevention materials of a frame body cross each other.

6. The air cell according to claim 1, wherein the one or more deformation materials is two deformation materials;
a second deformation prevention material for further partitioning the electrolytic solution space that is partitioned by a first deformation prevention material is formed; and
the electrolytic solution circulation part is formed on the second deformation prevention material for circulating the electrolytic solution in the electrolytic solution spaces partitioned by the second deformation prevention material.

7. The air cell according to claim 1, wherein
a current collector plate is arranged neighboring the negative electrode material, and any one of the one or more deformation prevention materials abuts the current collector plate directly.

8. The air cell according to claim 1, wherein
the flow allowable part has a plurality of convex parts.

9. An assembled battery, wherein
the air cells according to claim 1 are stacked on one another.

10. The air cell according to claim 1, wherein the one or more deformation prevention materials extend parallel to an injection direction of the electrolytic solution injected from outside.

* * * * *